INVENTOR
N. G. LONG
BY John K. Mullarney
ATTORNEY

Oct. 15, 1968 N. G. LONG 3,406,257

PARALLEL TASI SYSTEM WITH COMMON MEANS FOR CALL ASSIGNMENT CONTROL

Filed Oct. 7, 1964 5 Sheets-Sheet 2

Oct. 15, 1968 N. G. LONG 3,406,257

PARALLEL TASI SYSTEM WITH COMMON MEANS FOR CALL ASSIGNMENT CONTROL

Filed Oct. 7, 1964 5 Sheets-Sheet 3

Oct. 15, 1968 N. G. LONG 3,406,257

PARALLEL TASI SYSTEM WITH COMMON MEANS FOR CALL ASSIGNMENT CONTROL

Filed Oct. 7, 1964 5 Sheets-Sheet 4

United States Patent Office 3,406,257
Patented Oct. 15, 1968

3,406,257

PARALLEL TASI SYSTEM WITH COMMON MEANS FOR CALL ASSIGNMENT CONTROL

Norwood G. Long, Millington, N.J., assignor to Bell Telephone Laboratories, Incorporated, New York, N.Y., a corporation of New York Filed Oct. 7, 1964, Ser. No. 402,091
7 Claims. (Cl. 179—15)

ABSTRACT OF THE DISCLOSURE

Two time assignment speech interpolation (TASI) systems are conected in parallel to utilize the increased channel capacity of a speech transmission facility. Each input subscriber line is connected to a speech transmission gate in each of the two TASI systems. Subscriber identification codes to identify the active input lines are queued up in memory units in both TASI systems. An assignment control system common to both TASI systems determines which TASI system shall transmit the subscriber call basing its decision on speech transmission channel availability in either of the two parallel TASI systems.

Figure 1A:
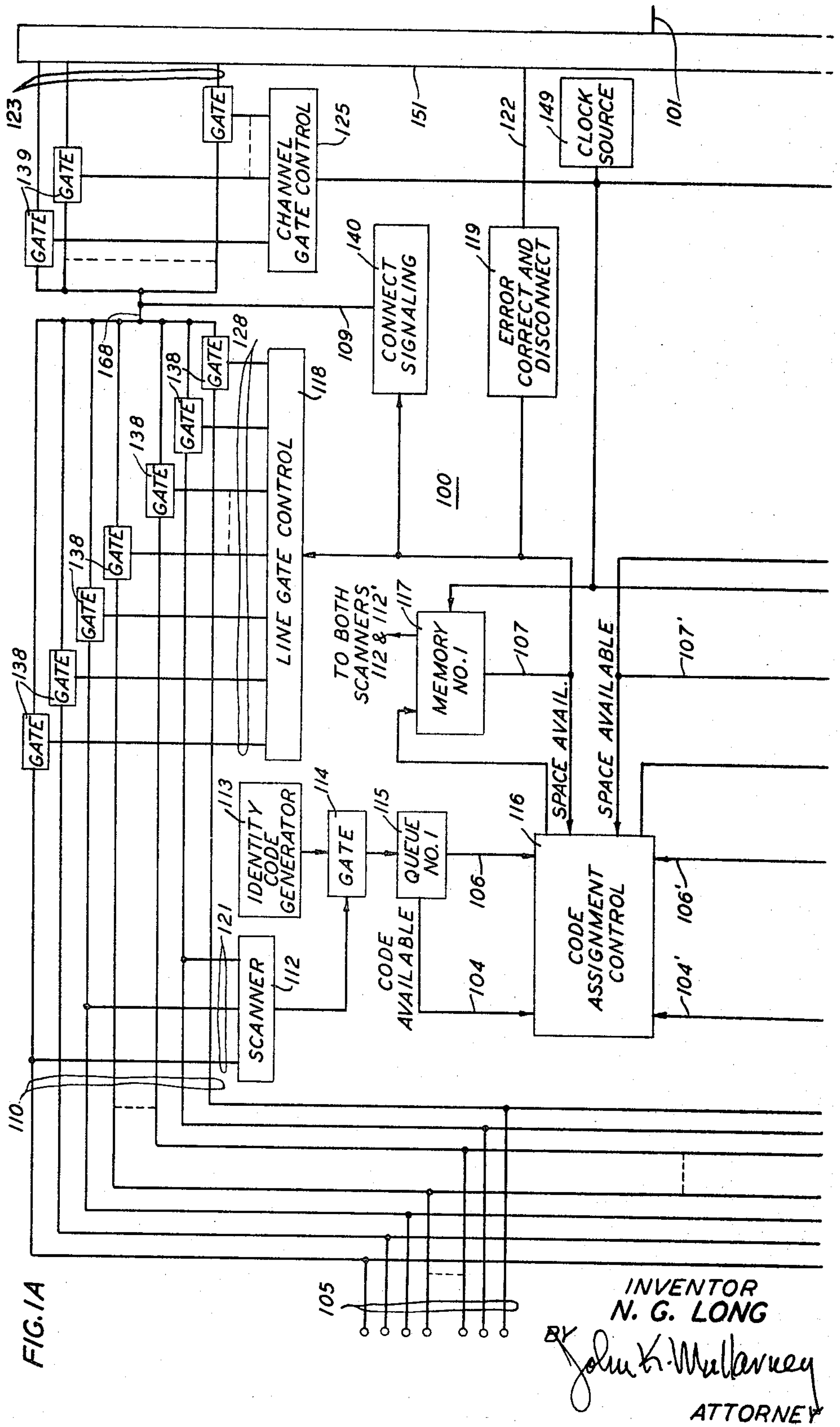

This invention relates to time assignment speech interpolation (TASI) telephone transmission systems, and, more particularly, to a novel combination of a plurality of such systems to utilize increased capacity transmission facilities connecting the transmission and receiver ends of such a system.

In time assignment speech interpolation (TASI) telephone transmission systems, such as that disclosed by A. R. Kolding et al. Patent 2,957,946, issued Oct. 25, 1960, a fixed number of speech transmission channels are used to transmit the speech of a greater number of telephone subscribers. Each subscriber actively engaged in speaking to a particular party is connected, via a high speed switching facility, to one of a plurality of speech transmission channels. Each talker line is cyclically monitored to determine whether a subscriber is or is not actively talking on that line. If the subscriber is talking, a signal indicative of this activity is sent to a control circuit. The control circuit generates a code identifying the talker line that is active. These identification codes are arranged in a queue, and are sequentially stored in a memory circuit. The memory circuit controls high speed switching means to connect the active talker lines to available transmission channels.

It can be seen that a transmission channel is assigned to a subscriber only after he begins speaking. Should other subscribers be in need of a connection, the subscriber who has previously been assigned a channel is disconnected from that transmission channel when he ceases to speak. Because of this disconnection when transmission channels are in demand, the subscriber's conversation is transmitted in the form of speech fragments or "talkspurts."

A signaling system keeps the receiving end of the TASI system informed of the connections which the transmitting end has established by sending coded information over each transmission channel in advance of each talkspurt. The receiving end, in response to these signals, makes the connections necessary to connect the talker's speech fragments to the called party.

The assignment of talker lines to transmission channels in the TASI system is controlled by digital logic techniques. Each of the talker lines is scanned at a predetermined frequency to determine the status of the subscriber connected thereto. The identity of each active line is stored as a digital code with some predetermined number of binary digits and is used to control the aforementioned interconnections.

The original TASI systems built and now in use were designed for use with submarine cables having a thirty-six channel capacity. The control logic circuits and codes used therein were designed with a digit capacity to handle this size of cable. Newer cables, however, have been designed having more than double the channel capacity of present cables. To fully utilize the added capacity with a TASI arrangement, increased capacity digital logic is required to control the high speed switching. In turn, newly designed pulse and digital logic circuits of greater complexity are required. This new equipment must operate at a higher frequency to handle the increased traffic. Moreover, such equipment requires a binary code of increased bit capacity, thus incurring greater expense and rendering obsolete the present equipment for which no other use exists.

It is therefore an object of the present invention to utilize fully the new increased capacity cables in a TASI system with maximum use of the existing TASI control circuitry.

It is a more specific object to enable a subscriber to be routed automatically through one of several TASI systems on the basis of available channels.

It is yet another object to control all TASI systems and to scan all talker lines simultaneously, yet retaining the same fundamental scanning frequency.

In accordance with the present invention, each subscriber line is connected directly to the talker gating circuits of a plurality of TASI systems connected to a particular transmission cable. The active talkers are scanned, identified with a digital code, queued, and entered in only one of the TASI system memories. A control system common to all the TASI systems determines which memory of the combined TASI systems shall receive the code, basing its decision on memory storage space availability in each of the TASI systems.

In the specific illustrative embodiment of the invention disclosed hereinbelow, two, thirty-seven channel TASI systems, each accommodating one hundred and twenty talker lines, are used to provide a seventy-four channel system servicing two hundred and forty talker lines. Each of the TASI systems is similar to, and may be identical with, the one described in the Kolding et al. patent, supra. The incoming talker lines are each scanned by their respective TASI systems. The corresponding queue circuit then stores the talker line identification of active lines until a vacant switching slot in any one of the memory circuits is presented. Because of the increased number of talker lines to be identified, the identification code must be provided with one extra bit of information. Accordingly, the code generator and storage equipment must be modified to accommodate the extra digit.

Both memory circuits are regulated by a control circuit common to the two TASI systems. When a vacant time slot appears in one of the memory circuits, the control circuit directs the identification code to that memory circuit and prevents the talker line identification from being entered into the other memory circuit. The subscriber is connected to a transmission channel through the switching mechanism under the control of the memory circuit in its associated TASI system.

The speech, or "talkspurt," of each subscriber is transmitted to the corresponding receiving portion of the TASI system. The talkspurt of the subscriber is preceded by a destination code which sets up the proper connections to the called party in the receiver portion of the TASI system. Each TASI receiver has double its normal complement, or two hundred and forty listener lines, in the specific embodiment shown. Each called party is connected to a particular listener line in each of the receivers. The connection is maintained until the connection is needed by another subscriber, at which time a disconnect control signal is sent over a separate control channel.

The present invention therefore serves to utilize a plurality of TASI systems to provide a single composite system of increased capacity with a minimum of change needed in the control circuitry.

Figure 1B:
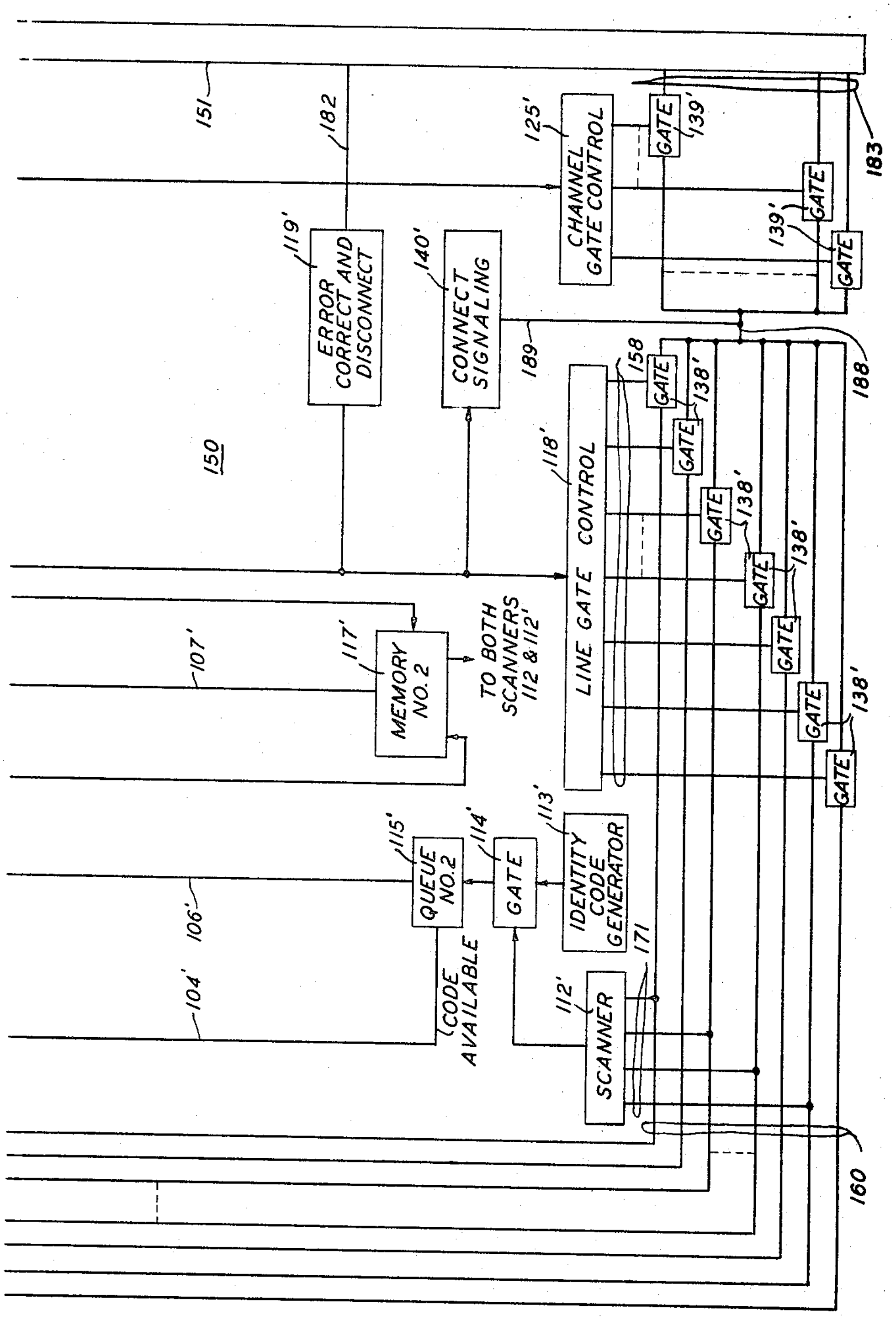
Figure 2A:
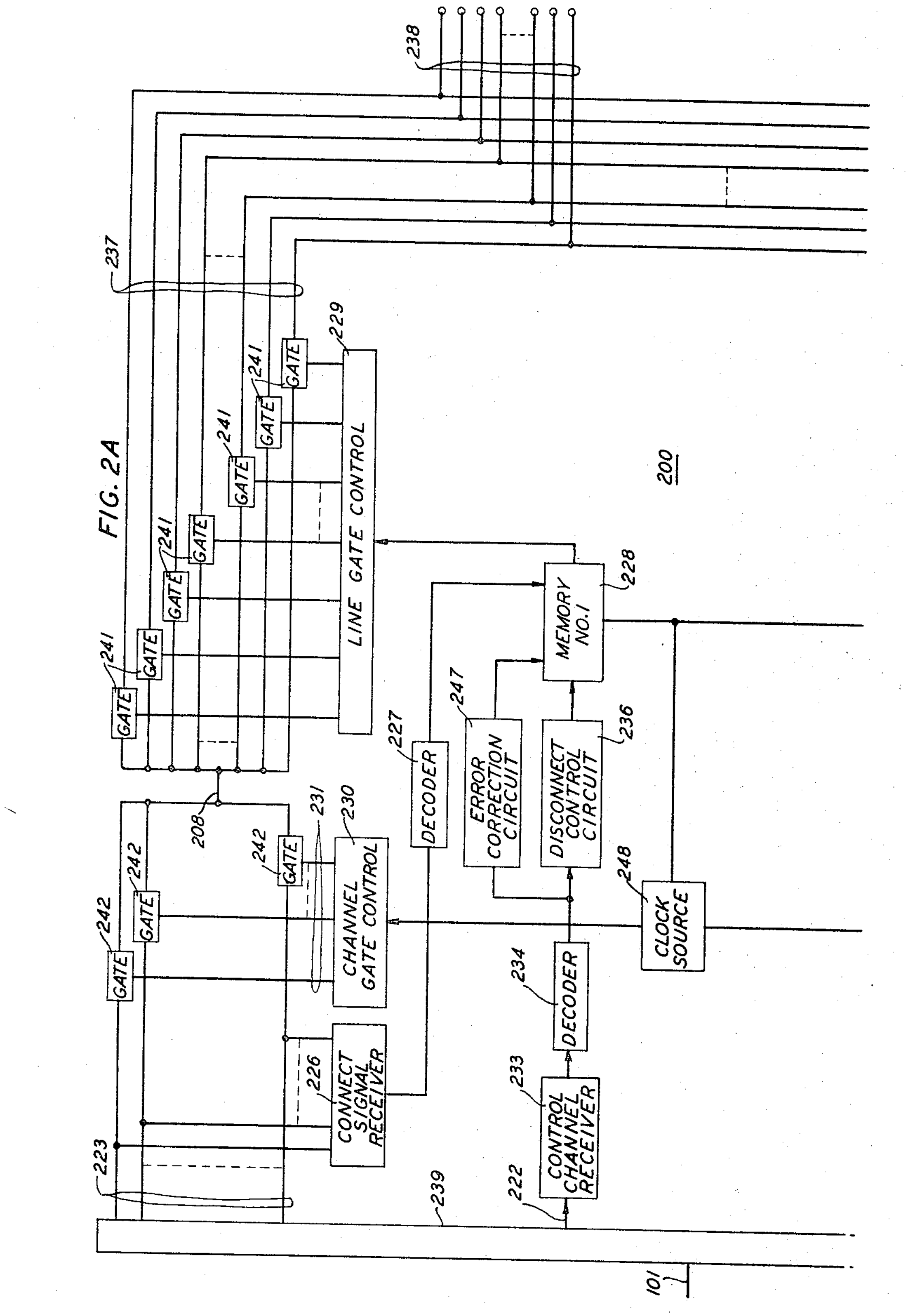
Figure 2B:
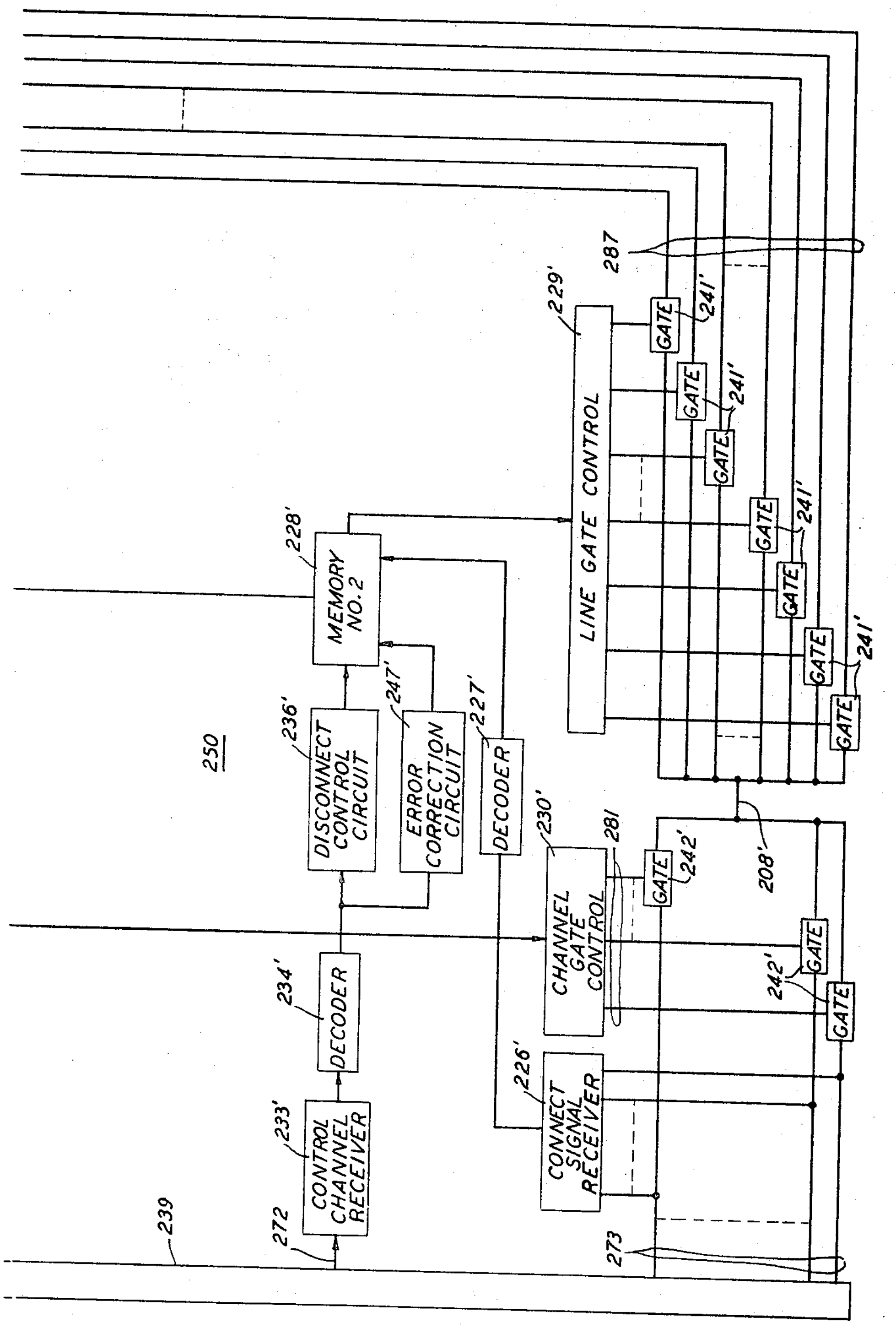
Figures 3, 4:
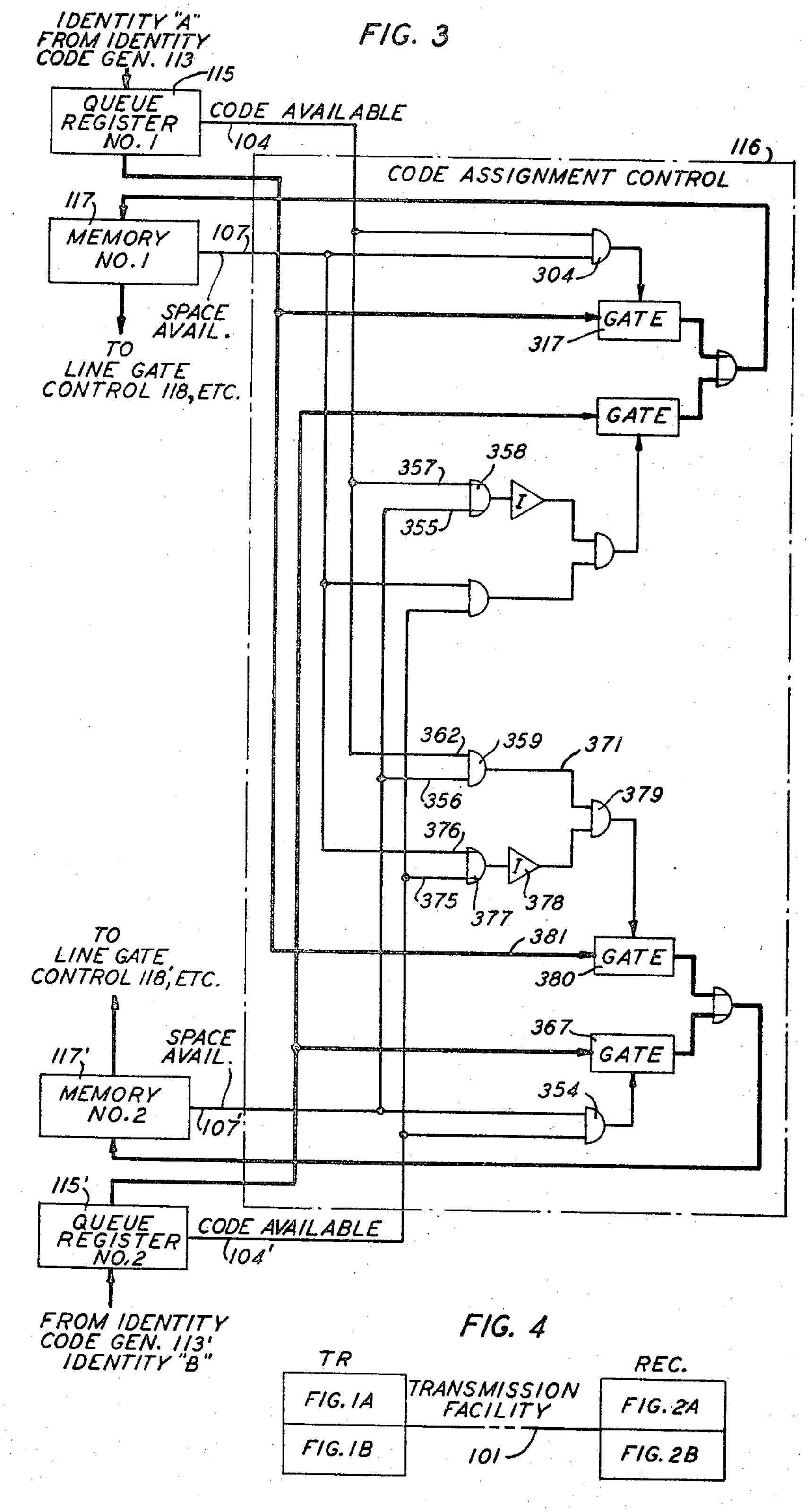

These and other objects and features, the nature of the present invention and its various advantages, will appear more fully upon consideration of the attached drawings and of the following detailed description of the drawings in which:

FIGS. 1A and 1B, when arranged in the manner shown in FIG. 4, represent a general block diagram of two TASI transmitters connected in parallel with a common control circuit according to the present invention;

FIGS. 2A and 2B, when arranged in the manner shown in FIG. 4, represent a general block diagram of two TASI receivers connected in parallel according to the present invention;

FIG. 3 shows a more detailed block diagram of the control system common to the two TASI transmitters; and FIG. 4 shows the manner in which FIGS. 1A, 1B, 2A and 2B may be arranged to illustrate the entire TASI system.

Referring to FIGS. 1A and 1B as arranged according to FIG. 4, there is shown therein a schematic block diagram of the transmission portion of a time assignment speech interpolation system embodying the principles of the present invention. The system comprises two TASI transmitters 100 and 150 shown in FIGS. 1A and 1B, respectively, which for illustrative purposes only are assumed to interconnect two hundred and forty subscribers connected to the subscriber line 105 to a transmission cable 101 having seventy-four channels. Each of the TASI transmitters 100 and 150 is substantially identical to the transmitter disclosed in the Kolding et al. patent, supra. For clarity in describing the invention, corresponding circuit components in the two TASI transmitters are numbered identically with a prime superscript differentiating between the two systems.

Each subscriber is connected in parallel, via the subscriber lines 105, to one of the input lines 110 of TASI transmitter 100 and one of the input lines 160 of TASI transmitter 150. That is, an individual input line is provided in each of the TASI transmitters for each and every subscriber line 105. Each of the input lines 110 and 160 is connected to a respective one of the talker line gating circuits 138 or 138', depending on with which TASI transmitter it is associated. The talker gates 138 and 138' of the active talker lines are operated synchronously with appropriate ones of the channel gates 139 and 139', respectively. The talker and channel gates may each comprise any analog signal gate which is enabled when a particular input lead is energized. Such gates are well known in the art and need not be described in detail. One such gating circuit is disclosed in C. J. May Patent 3,027,524, issued Mar. 27, 1962.

The signaling control circuitry in the two TASI transmitters are substantially identical and hence only the operation of one of these transmitters need be described in detail. The signaling control circuitry of each of the two TASI transmitters 100 and 150 scans one-half of the total number of incoming subscriber lines 105. A scanner 112 continuously monitors, sequentially, via leads 121, the speech activity of the odd-numbered ones of the incoming talker lines 110 in the TASI transmitter 100. An identical scanner 112' in the TASI transmitter 150 scans the even-numbered ones of the incoming talker lines 160, via leads 171.

The identity code generators 113 and 113' are synchronized with each of the respective scanning circuits 112 and 112'. As the scanning circuit 112 interrogates each of the incoming talker lines 110, the identity code generator 113 generates a distinct binary code to identify each of the talker lines at the moment it is interrogated. The identity code generator 113' performs identically in connection with the scanning circuit 112'.

When the scanning circuit 112 "locates" active speech on a particular talker line, it applies a gating signal to the gating circuit 114, permitting the passage of the particular code generated by the code generator 113 at that instant. The identity code generator 113 generates a binary code which represents the identity of the talker line synchronized with the time at which it is interrogated. The identity code generator 113 in the illustrative embodiment must generate at least one hundred and twenty different code designations, one for each of the talker lines scanned (half of the total number of talker lines). A binary code as used in the illustrative embodiment, for example, has seven bits of information in order to uniquely identify the one hundred and twenty talker lines. Before further processing, an additional bit of information must be added to identify whether the talker is in the even or odd group, making eight bits in all. The code generator may comprise, for example, any binary counter capable of generating a sequence of binary identity codes in synchronism with the scanning of the talker lines.

The codes generated by the code generator 113 are stored in the queue register circuit 115 in the order in which they are generated. An identical queue register circuit 115' in the TASI transmitter 150 stores the identities of active ones of the scanned talker lines 160. Each of the queue circuits has a plurality of stages of storage and sequentially shifts the stored codes from stage to stage until they are transferred out of the queue. The queue circuits may comprise a plurality of shift register stages. A queue suitable for use in applicant's invention is disclosed and explained in the Kolding patent, supra. The queue circuit therein disclosed must be modified to store a binary code having eight bits of information instead of the seven-bit code used in the aforementioned Kolding patent.

The disposition of the binary code stored in the respective queue registers 115 and 115' is regulated by the code assignment control circuit 116. The code assignment control circuit 116 assigns the stored identity code from either of the queue registers 115 and 115' to one of the memory circuits 117 and 117' depending upon which one has available storage space.

The code assignment control circuit 116 monitors the memory circuits 117 and 117' to determine if storage space is available in either one of these memory circuits. If, for instance, the memory circuit 117 has space available, it transmits that information to the code assignment control circuit 116, via lead 107. The code assignment control circuit in the meantime interrogates the queue registers 115 and 115' via leads 106 and 106' to determine if either one contains an active talker code. The code assignment circuit utilizes this information together with the information from the memory concerning available storage space and assigns an active talker code from one of the queue registers to one of the memories on the basis of this information. The assignment process will be described in greater detail in connection with FIG. 3.

The memory circuits 117 and 117' may comprise a plurality of parallel delay loops, the number of parallel loops being equal to the number of individual bits in the identity code, which in the illustrative embodiment is eight. The normal TASI code as disclosed in the aforementioned Kolding et al. patent, is a seven-bit code. Hence, existing memory circuits must be modified by the addition of an extra delay line to store the extra digit.

The identity codes in the memory circuits 117 and 117' continuously circulate at the channel gate switching frequency through the respective delay loops until the talker line corresponding to that particular identity code is to be disconnected from the transmission cable. As additional talkers need connections, the identity codes of inactive talkers are erased from the memory. A detailed explanation of the memory circuit and the erasing of the identity codes of inactive talkers is presented in the aforementioned Kolding et al. patent. The circuit described therein, while designed for use with a seven-bit logic, may be adapted to the eight-bit logic required of the present circuit without substantial alteration.

The memory circuit 117 applies its stored codes sequentially to the line gate control circuit 118. The line gate control circuit 118 operates the talker gates 138, via the leads 128. Each of the identity codes applied to the line gate control circuit uniquely identifies a particular talker line. The talker identity code is utilized by the line gate control circuit to close the gate connected to that particular talker line.

The identical memory circuit 117' in the TASI transmitter 150 applies its code to the line gate control circuit 118' which operates the talker gates 138', via leads 158. The line gate control circuits 118 and 118' may comprise a translator which translates the binary codes from memory circuits 117 or 117' into an activating signal on one of leads 128 or 158.

The output of the memory circuit 117 is also applied to the connect signaling circuit 140. An identical connect signaling circuit 140' is contained in the TASI transmitter 150. The connect signaling circuit 140 generates unique multifrequency codes to identify active talker lines as they are connected to the TASI transmitter. These signals are applied to the common switching bus 168, via lead 109, or in the case of TASI transmitter 150 the switching bus 188, via lead 189.

The common switching bus 168 or 188 is connected to its respective group of transmission channels 123 or 183 by way of the channel gates 139 and 139', respectively. The connect signaling circuits in the illustrative embodiment may comprise a translator to convert the binary identity code into a four-out-of-fifteen tone signaling code and gating means to apply the code to the multiplex facility synochronously with the operation of appropriate channel gates. The connect signaling code is timed to precede each new active "talkspurt" at the beginning of its transmission. The connect signaling code informs the receiver portion of the TASI system as to the identity of each arriving speech fragment. This identity signal is used in the receiving equipment to connect the appropriate listener to each active talker.

The talker gating arrangement described above forms the input of a time divided multiplex switching system. The outputs of the talker gates 138 are connected to the common switching bus 168 to which also are connected a plurality of channel gates 139 and thence the speech channels 123. The actual number of speech channels needed to service the incoming talker lines is determined by the speech distribution on the aforementioned talker lines. It has been empirically determined that average speech includes a sufficiently high percentage of silent periods to permit the interpolation of the speech on only one-half to one-third of as many speech channels. One advantage of combining two previously known TASI systems in the manner described above is that the fraction of channels required may be significantly smaller, without any adverse effect, than in a single system.

The channel gates 139 and 139' connect the speech signals from the respective signal buses 168 and 188 to the individual speech channels 123 and 183. These gates are controlled by their respective channel gate control circuits 125 and 125', which, in turn, are driven by the clock source 149 common to both the TASI transmitters 100 and 150. The pulse rate of the clock source is chosen in the illustrative embodiment so that each of the channel gates is enabled each one hundred and twenty-five microseconds or at exactly an eight kilocycle frequency.

The read-out of the two memory circuits 117 and 117' is synchronized with the clock source 149 in such a way that each time a channel gate is enabled, a code identifying the talker assigned to the enabled channel is read out from the memory circuit 117 or 117' and applied to its respective line gate control circuit 118 or 118'. The appropriate line gate is then operated simultaneously with the operation of one of the channel gates. Because the odd and even numbered talker lines are scanned simultaneously by the respective TASI transmitters, the invention permits the use of the same frequency of operation as was previously used in operating only one of the TASI transmitters.

It can be seen from the above description that the line gates 138 and 138' serve to derive amplitude modulated pulse samples from the speech signals on the respective talker lines 110 and 160. Each of the pulse samples is delivered by way of the respective buses 168 and 188 to one of the speech channels by way of one of the associated channel gates. The original speech signals are then reconstructed from these pulse samples by the means of filtering circuits in the transmission facility 151 for transmission over the multichannel cable 101.

When a particular talker line becomes inactive, the associated scanning circuit 112 or 112' generates a signal that indicates this condition as that particular talker line is scanned. When the channel assigned to that particular talker is needed by a newly active talker because no unused speech transmission channel is available, a search is made for inactive but assigned talker lines. When an inactive talker is discovered, this information is supplied to the disconnect circuit corresponding to the memory circuit in which its identity code is stored. The error correction and disconnect signaling circuits 119 and 119' then generate signaling codes to their respective control channels 122 or 182 to be transmitted to the TASI receiver. Full disclosure of these signaling circuits is given in the aforementioned Kolding patent. The TASI receiver, as will be described subsequently, utilizes the disconnect signal to disconnect listeners from the inactive channel.

It can be seen from the foregoing explanation that each incoming subscriber is connected to two paralleled TASI transmitters. The two TASI transmitters each scan one-half of the incoming talker lines simultaneously to detect speech activity. When such activity is detected, a control circuit common to both paralleled TASI transmitters assigns the subscriber an unused channel in the TASI transmitter having the most immediate availability. The subscriber retains that channel connection until he is silent and his channel is needed for another talker.

Referring to FIGS. 2A and 2B as arranged according to FIG. 4, the receiver portion of the TASI system consisting of two parallel TASI receivers 200 and 250 shown in FIGS. 2A and 2B, respectively, is illustrated. The speech transmitted by the seventy-two channel cable 101 is recovered and directed by the receiver facility 239 into two parallel and independent sets of thirty-six speech channels 223 and 273, respectively. The control signals are received on the control channels 222 and 272, respectively, depending upon which TASI transmitter controls the speech transmission.

The paralleled TASI receivers 200 and 250 shown in FIGS. 2A and 2B, respectively, are identical to each other and have identical receiver control circuitry. The TASI receiver used by a particular signal is dependent only upon the transmitting speech channel used for a particular party at the transmitting end. The two TASI receivers 200 and 250 supply their outputs to the listener lines 238 so that a signal received on any one of the incoming channels can be addressed to any one of the two hundred and forty listeners. This is achieved by connecting each listener in parallel to each receiver and altering the memory circuits 228 and 228' to control all of the two hundred and forty listening gates. Each speech channel at the TASI transmitter is connected to a corresponding speech channel at the TASI receiver end. Since each receiver operates in effect independently of the other, only the operation of one of the receivers 200 need be considered in detail. Identical components in the second receiver 250 are shown in FIG. 2 with the same reference numeral as in the first receiver, with an added prime.

A bank of connect signal receivers 226 is connected to the speech channels 223. The connect signal receivers monitor the speech channels for special connection signals sent by connect signaling circuit 140 in the TASI transmitter. The connection signals received by the connect signal receiver 226 are applied to a decoder 227 which converts the multifrequency code into a binary digital code and the decoder transfers the converted talker identity code to the memory circuit 228.

The memory circuit 228 may be identical in operating principle to the memory circuit 116 in the TASI transmitter. The memory circuit 228 stores and circulates the respective identity codes in synchronism with the gating of the speech transmission channels. The memory circuit applies these stored codes sequentially to the line gate control circuit 229 which controls the operation of the line gates 241. The activated ones of the line gates 241 connect selected ones of the two hundred and forty listener lines 237 to the speech channels 223. The TASI receiver 250 likewise controls the line gates 241' and hence the connecting of the listener lines 287 to the speech channels 273. The two groups of listener lines 237 and 287 are connected in parallel to leads 238 so that any called party connected may be connected to either group of speech channels 223 and 273.

Each of the groups of speech channels 223 and 273 connected to the two TASI receivers 200 and 250 contains a channel gate 242 or 242', which closes the channel circuit and completes the transmission path, via the respective common switching buses 208 and 208' to the respective group of listener lines 237 and 287.

The two groups of channel gates 242 and 242' are each operated sequentially by the respective channel gate control circuits 230 in the TASI receiver 200 and its counterpart 230' in the TASI receiver 250, via leads 231 and 281. Both of the channel gate control circuits are responsive to and synchronized with the respective memories 228 and 228' by clock source 248. The identity codes generated by the decoder 227 and its counterpart 227' in the TASI receiver 250 are injected into the corresponding memory circuit. The clock source 248 controls the memory circulation and the read-out of both of the memory circuits 228 and 228' so that the particular identity code is read out of the memory in synchronization with the operation of the respective channel gates 242 and 242'. The identity code read out of the memory 228 operates the listener gates 241 in synchronism with the channel gates 242 so that speech transmitted by a channel gate has a readily available path through a simultaneously operated listener gate. The same sequence of events also occurs in the receiver control circuit of the TASI receiver 250.

A control channel receiver 233 is connected to the control channel 222 and an identical control channel receiver 233' is connected to the control channel 272 in the TASI receiver 250. The control channel receivers serve to receive the coded error correction and disconnect signals transmitted on the respective control channels and apply these signals to effect the desired control of certain functions of the TASI receiver system. The control channel receiver 233 applies the signals on the control channel 222 to a decoder circuit 234. A suitable control channel receiver and decoder are disclosed in the aforementioned Kolding et al. patent.

If a disconnect signal has been received, the information is transferred to the disconnect control circuit 236 which utilizes the information to erase from the memory 228 the talker identity code representing the talker being disconnected. Since the code is no longer in the memory circuit 228, the corresponding line gate 241 will no longer be operated and the listener will be disconnected.

If an error correction code has been received over the control channel 222, the decoder 234 applies the information to the error correction circuit 247. The error correction circuit 247 utilizes this information to correct the talker identity code stored in the memory 228. In this way errors due to faulty transmission may be promptly rectified. An error correction and disconnect circuit suitable for use in the present system is disclosed in the aforementioned Kolding patent.

In summary, it may be seen from the foregoing that two standard TASI systems are interconnected in such a fashion as to increase the efficiency of each of the systems. In each of the systems, the talker gates are duplicated for every incoming subscriber line. A scanning circuit in each of the TASI systems interrogates one-half of the respective talker lines and applies to its respective queue the identity codes of the active talker line connected thereto. A control circuit interrogates the queues in each of the TASI systems and assigns the talker identity code to one of the memory circuits in either of the TASI systems, based on which memory has available storage space. The memory circuit controls the logic circuits in its respective TASI system to control the operation of the respective talker and channel gates and permit transmission of the speech fragment over the cable channel. The speech fragment is transmitted over the cable to one of a pair of TASI receiver units which connects the speech channel to the appropriate listener line. All the listener lines are connected to each TASI receiver in order to effect the desired connection.

Referring now to FIG. 3, there is shown a more detailed illustration of one method of implementing a control circuit 116 (FIG. 1A) to assign the talker identity codes to the TASI systems with available channel space. An understanding of the function of the assignment control unit 116 can be best obtained by considering its function when a talker identity code A (as shown in FIG. 3) is waiting in queue 115 and a talker identity code B is waiting in queue 115'. It is assumed for illustrative purposes that the memory 117 has no available storage space and memory 117' has sufficient unused storage space to handle both identity codes.

The memory 117' gives an indication that it has available storage space by means of a signal on lead 107'. Such a signal may be generated by some form of interrogating circuit which monitors the circulation codes in the memory and produces a signal upon discovery of a vacant storage slot. In the above-mentioned Kolding et al. patent, a separate status code in the memory 117' indicates the condition. The absence of such a signal on lead 107 from the memory 117 indicates that no storage space is currently available in that memory.

The respective queuing circuits 115 and 115' indicate that a particular talker identity code is seeking access to one of the memory circuits by applying an output signal to the leads 104 and 104', respectively. The signals on leads 104' and 107' are applied simultaneously to the AND gate 354. This permits a signal to be applied to the identity code gate 367. The gate 367, when so energized by a signal from the AND gate 354, permits the talker identity code stored in the queue 115' to be transferred to the memory circuit 117'.

The memory circuit 117, having no available space, applies no signal to lead 107 and, hence, the AND gate 304 permits no enabling signal to be transmitted to the gate 317. The talker identity code A, presently in queue 115, is denied transmission by the gate 317 and is not applied to the memory circuit 117. The memory circuit 117', however, has an available storage slot and indicates this storage slot availability by means of a signal on lead 107'.

The signal output on lead 107' is simultaneously applied to the input lead 355 of the OR gate 358 and the input lead 356 of the AND gate 359. Similarly, the signal output on lead 104 is also simultaneously applied to the input lead 357 of the OR gate 358 and the input lead 362 of the AND gate 359. The simultaneous energization of the input leads 356 and 362 permits the AND gate 359 to transmit a signal to the input lead 371 of the AND gate 379. The absence of signals on the input leads 375 and 376 of the OR gate 377 permits the inverter 378 to apply a signal to the AND gate 379. This simultaneous energization of the inputs to the AND gate 379 permits a signal to be applied to the transmission gate 380. The waiting identity code located in queue 115 is thus transmitted, via lead 381, and transmission gate 380 to the memory circuit 117' where it is entered into the available storage slot.

A similar and symmetrical analysis may be used to demonstrate that an identity code from queue 115' may be entered into memory 117 if the availability of storage space so dictates. Because of the symmetrical nature of the code assignment control 116, it is not believed necessary to give a detailed description of such an assignment inasmuch as the operation of the circuit is identical to that described above.

It is to be understood that the above-described arrangements are only illustrative of the numerous and varied other arrangements which could represent applications of the principles of the invention. Such other arrangements may readily be devised by those skilled in the art without departing from either the spirit or the scope of the invention.

What is claimed is:

1. A signal transmission system comprising a plurality of groups of signal sources, a plurality of transmission channels lesser in number than the totality of said signal sources, means for enabling said transmission channels in regular succession, means associated with each of said groups of signal sources for generating coded identifications of active ones of said signal sources, a memory storage means associated with each of said groups of signal sources, means to arrange said coded identifications associated with each of said groups of signal sources into sequential order, control means to insert said coded identifications arranged in said sequential orders into a selected one of said memory storage means selected on the basis of storage space availability, and means synchronized with said enabling means and controlled by said memory storage means to gate said signal sources into said channels.

2. A signal transmission system according to claim 1 wherein said control means includes means to interrogate each of said memory storage means, means to enable the transmission of said coded identifications to said selected one of said memory storage means, and means to disable the transmission of said coded identifications to other ones of said memory storage means.

3. In a signaling transmission system, a first group of a plurality of signal sources, a second group of a plurality of signal sources, a combined plurality of transmission channels associated with said first and second groups and lesser in number than the combined total of said first and second groups, means to cyclically scan said signal sources for activity, means associated with each of said groups to generate a code identifying each active source scanned, means for queuing said codes in each of said groups in the order in which said active sources are scanned by said cyclical scanning means, code storage means associated with each of said groups including means to store said codes in selected storage positions, means to monitor each of said code storage means to detect the unused storage positions therein, means utilizing said monitoring means to assign said queued codes to the code storage means with available space, and means controlled by said code storage means for connecting identified sources to available transmission channels.

4. The combination according to claim 3 wherein said assigning means includes means to prevent the transfer of said queued codes to other than the selected one of said code storage means.

5. A time assignment speech interpolation system comprising, a plurality of signal sources, a plurality of speech transmission systems, each comprising a plurality of transmission channels, the number of said transmission channels being less than the number of said signal sources, means for connecting any one of said signal sources to any one of said transmission systems, means to scan all of said signal sources and to generate coded identifications for those signal sources which are active, means to store said coded identities of active signal sources in a priority queue, control means to determine the availability of transmission channels in each of said transmission systems, means associated with each of said transmission systems to register coded and queued identities, and means to utilize said registered identities to direct the connections to available transmission channels, said control means being operative to transfer said coded identities to the registering means associated with the transmission system having available transmission channels.

6. A time assignment speech interpolation system according to claim 5 wherein said control means further includes means to interrogate each of said registering means, means to enable a transmission path to transfer said coded identities stored in said queue to the one of said registering means having available space, and means to disable the transmission paths to other ones of said registering means.

7. A signal transmission system comprising a plurality of signal sources, first means to scan one-half of said signal sources for signal activity, second means to scan the other half of said signal sources for signal activity, means associated with each of said scanning means to generate coded identifications of each of said active signal sources, means to register said codes in sequential order, a first group of transmission channels associated with said first scanning means, a second group of transmission channels associated with said second scanning means, a first storage means to store said code identifications and to connect active signal sources to said first group of transmission channels, a second storage means to store said coded identifications and to connect active signal sources to said second group of transmission channels, and code assignment means to transfer said sequentially ordered codes in said registration means to one of said storage means, said code assignment means being responsive to the availability of transmission channels in each of said groups of transmission channels.

References Cited

UNITED STATES PATENTS

| | | | |
|---|---|---|---|
| 2,541,932 | 2/1951 | Melhose | 179—15 |
| 3,311,707 | 3/1967 | Urquhart-Pullen | 179—15 |

ROBERT L. GRIFFIN, *Primary Examiner.*

R. E. GORDON, *Assistant Examiner.*